(12) United States Patent
Sharifi-Mehr

(10) Patent No.: US 12,508,056 B2
(45) Date of Patent: Dec. 30, 2025

(54) STYLET FEEDER FOR SURGICAL TOOL

(71) Applicant: VB Spine US Opco LLC, Leesburg, VA (US)

(72) Inventor: Amir Ali Sharifi-Mehr, Bloomingdale, NJ (US)

(73) Assignee: VB Spine US Opco LLC, Leesburg, VA (US)

( * ) Notice: Subject to any disclaimer, the term of this patent is extended or adjusted under 35 U.S.C. 154(b) by 276 days.

(21) Appl. No.: 18/152,874

(22) Filed: Jan. 11, 2023

(65) Prior Publication Data

US 2023/0218321 A1 Jul. 13, 2023

Related U.S. Application Data

(60) Provisional application No. 63/298,733, filed on Jan. 12, 2022.

(51) Int. Cl.
*A61B 17/70* (2006.01)
(52) U.S. Cl.
CPC .................. *A61B 17/7082* (2013.01)
(58) Field of Classification Search
CPC ............ A61B 17/7082; A61B 17/8875; A61B 17/0218; A61B 17/1622
See application file for complete search history.

(56) References Cited

U.S. PATENT DOCUMENTS

| | | |
|---|---|---|
| 7,326,203 B2 | 2/2008 | Pellegrino et al. |
| 8,623,027 B2 | 1/2014 | Price et al. |
| 8,974,932 B2 | 3/2015 | McGahan et al. |
| 2010/0176584 A1 | 7/2010 | Ito et al. |
| 2015/0366569 A1 | 12/2015 | Miller |
| 2016/0374723 A1 | 12/2016 | Frankhouser et al. |
| 2018/0177521 A1 | 6/2018 | Faller et al. |
| 2020/0281608 A1* | 9/2020 | Sharifi-Mehr ....... A61B 17/848 |
| 2022/0175425 A1* | 6/2022 | Wall ................... A61B 17/7086 |

FOREIGN PATENT DOCUMENTS

EP 3308824 A1 4/2018

* cited by examiner

*Primary Examiner* — Si Ming Ku
(74) *Attorney, Agent, or Firm* — Lerner David LLP

(57) ABSTRACT

A stylet feeder for connection to a surgical tool includes a base for attaching to a surgical tool, the base having a platform and a skirt extending distally from the platform. The stylet feeder also includes an extension protruding proximally from the platform of the base, the extension having a proximal end housing a pawl, the pawl having a distal end with a threaded portion. The base and the extension define a passage extending in a proximal-distal direction such that the stylet feeder is cannulated for accepting a stylet therethrough.

19 Claims, 7 Drawing Sheets

STYLET FEEDER FOR SURGICAL TOOL

CROSS-REFERENCE TO RELATED APPLICATIONS

This application claims the benefit of the filing date of U.S. Provisional Patent Application No. 63/298,733 filed Jan. 12, 2022, the disclosure of which is hereby incorporated herein by reference.

BACKGROUND OF THE INVENTION

The present invention generally relates to surgical tools, and more particularly, to surgical tool adaptors for single step insertion of spinal fasteners.

A technique commonly referred to as spinal fixation is employed for fusing together and/or mechanically immobilizing vertebrae of the spine. Spinal fixation may also be used to alter the alignment of adjacent vertebrae relative to one another so as to change the overall alignment of the spine. Such techniques have been used effectively to treat many degenerative conditions and, in most cases, to relive pain suffered by the patient.

In some applications, a surgeon will install pedicle screws into the pedicles of adjacent vertebrae (along one or multiple levels of the spine) and thereafter connect the screws with a spinal rod in order to immobilize and stabilize the vertebral column. Whether conducted in conjunction with interbody fusion or across single or multiple levels of the spine, the use of pedicle screws connected by fixation rods is an important treatment method employed by surgeons.

There remains room for improvement in the design of surgical tools for inserting pedicle screws, particularly for tool adaptors that allow for safe and accurate single-step insertion of pedicle screws.

BRIEF SUMMARY OF THE INVENTION

According to an embodiment of the present disclosure, a stylet feeder for connection to a surgical tool includes a base for attaching to the surgical tool, the base having a platform and a skirt extending distally from the platform. The feeder includes an extension that protrudes proximally from the platform of the base. The extension has a proximal end housing a pawl and the pawl has a distal end with a threaded portion. The base and the extension define a passage that extends in a proximal-distal direction such that the stylet feeder is cannulated for accepting a stylet therethrough.

In another embodiment, the skirt defines a gap that passes between opposing ends of the skirt when the stylet feeder is in a resting configuration.

In a further embodiment, each of the opposing ends of the skirt includes a lateral protrusion extending outward from the skirt.

In a further embodiment, each of the lateral protrusions defines an aperture therethrough for connection with a fastener.

In yet another embodiment, the stylet feeder for connection to a surgical tool also includes a fastener disposed through the apertures of the lateral protrusions. The fastener is configured to force the lateral protrusions toward each other and into a clamped configuration.

In another embodiment, at least one of the apertures is internally threaded.

In one embodiment, the fastener is a screw.

In an embodiment, the skirt and the platform define a cavity. A proximal end of a surgical tool can be disposed and secured within said cavity.

In another embodiment, the platform defines a slot that passes entirely through the platform and extends inward from and continuous with the gap.

In yet another embodiment, the gap and the slot define opposing cantilever arms of the base formed by portions of the platform and skirt.

In a further embodiment, the skirt and the platform define a cavity. A volume of the cavity defined by the skirt and the platform is variable and is based on positions of the cantilever arms with respect to each other.

In an embodiment, the platform defines a relief passing entirely through the platform. The relief is from and continuous with an end of the slot opposite the gap.

In another embodiment, the relief extends in an arc shape around a central portion of the platform.

In another embodiment, the extension defines a window that passes laterally therethrough.

In another embodiment, the pawl is pivotable such that the distal end can move toward and away from the passage through the extension.

In a further embodiment, the pawl is attached to the extension at a pivot point and separately attached to the extension by a spring.

In an embodiment, the threaded portion of the pawl is a left-handed thread.

In another embodiment, the extension further includes a second pawl having a distal end with a threaded portion. The threaded portions of the pawls oppose each other.

In a further embodiment, the pawls are pivotable. The distal ends of the pawls can pivot and move toward and away from each other for engaging with a k-wire when the k-wire is disposed within the passage.

In another embodiment, the skirt is located at an outer perimeter of the platform.

In other embodiments, a system includes a handheld surgical tool. A stylet feeder in accordance with the above embodiments is configured to attach to a proximal end of the surgical tool. The system further includes a screwdriver configured to be driven by a distal end of the surgical tool and a stylet. The stylet is configured to pass through a lumen that extends through the surgical tool, the stylet feeder, and the screwdriver when the surgical tool, stylet feeder, and the screwdriver are assembled.

In a further embodiment, the system also includes one or more additional handheld surgical tools of different sizes and/or configurations.

DETAILED DESCRIPTION

Figure 1:
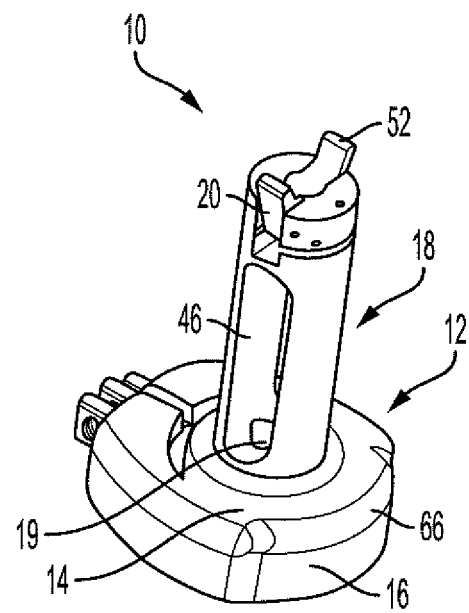
FIG. 1 is a perspective view of a stylet feeder in accordance with an embodiment of the present disclosure.

The present invention generally relates to a stylet feeder to be used in conjunction with pedicle screw insertion tools during spinal surgery. Those of skill in the art will recognize that the following description is merely illustrative of the principles of the invention, which may be applied in various ways to provide many different alternative embodiments.

The various embodiments of the stylet feeder 10 described below are designed to facilitate a universal tool attachment that provides for more efficient implantation of pedicle screws during spinal surgery.

FIGS. 1-7 depict a stylet feeder 10 according to one embodiment. The stylet feeder 10 is designed for connection to a surgical tool, e.g., a drill, and includes a base 12 and an extension 18. Base 12 includes a platform 14 that is generally planar and a skirt 16 extending downward or distally from a perimeter of the platform 14. The extension 18 extends upward or proximally from the platform 14 in an opposite direction from the skirt 16.

Figure 8:
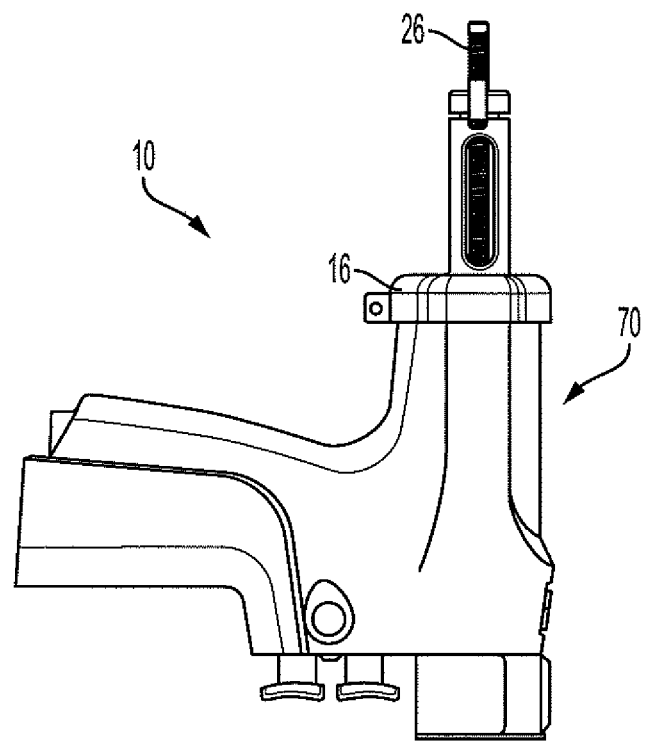
FIG. 8 is a side view of the stylet feeder of FIG. 1 attached to a drill.
Figure 9:
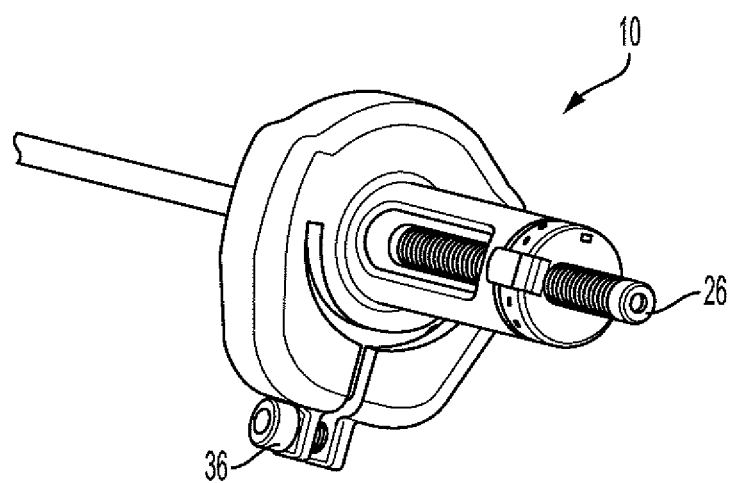
FIG. 9 is a perspective view of the stylet feeder of FIG. 1 connected with a stylet.
Figure 12:
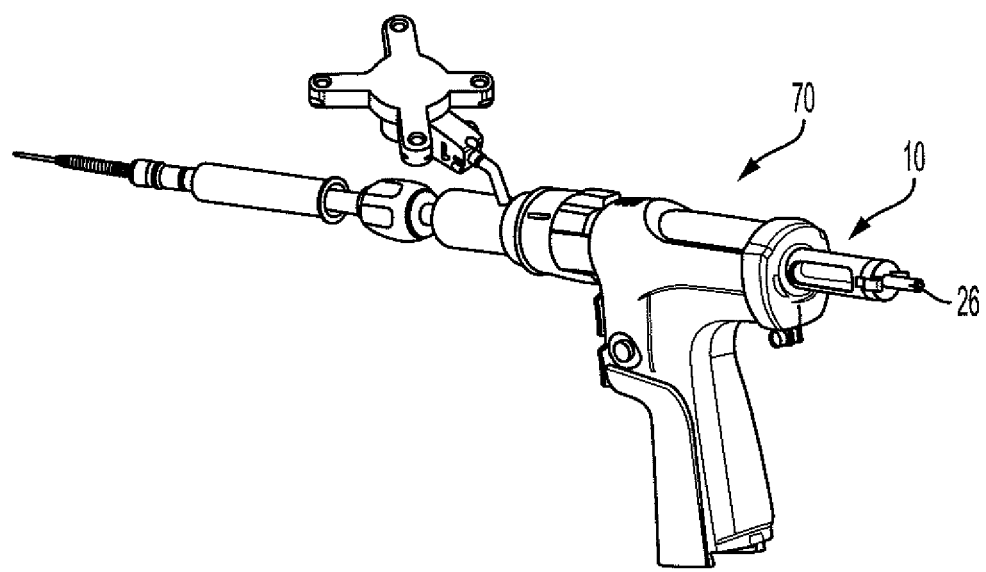
FIG. 12 is a perspective view of the stylet feeder of FIG. 1 attached to a drill.

Base 12 of the stylet feeder 10 is configured to attach to any one of a plurality of tools 70 for driving screws into bone. As depicted in the embodiment shown in FIGS. 1 and 2, skirt 16 extends distally from the outer perimeter of platform 14 to create a lip 64 on the distal end of the stylet feeder 10. Skirt 16 and platform 14 define a cavity 68 configured to engage with a tool 70 that is provided for driving a screw into bone, as shown in FIGS. 8 and 12. Cavity 68 may have a volume that varies due to independent movements of cantilever arms 42, 43, which is described in detail below. Lip 64 may be dimensioned so that it engages with the proximal end of tool 70. As depicted in FIGS. 3 and 8, lip 64 may be generally circular and may mate with a drill. In other embodiments, the lip 64 may be any shape adapted to mate with a bone insertion tool. Of course, as shown in FIG. 3, lip 64 is not exactly circular given that it is contoured to fit a particular tool or line of various tools. To this extent, the contouring and geometry of lip 64 can be decided during manufacture according to the tool(s) with which stylet feeder 10 will be used. Skirt 16 includes an edge portion 66 at which skirt 16 connects to platform 14. As shown in FIG. 3, edge portion 66 is a fillet. A filleted edge portion 66 may be preferable as it provides additional strength to base 12 when base 12 undergoes forces when a screw is driven into bone. Various radii and other edge portions 66, such as chamfers, are also envisioned.

Skirt 26 defines a gap 30 at one end and a slot 40 extends continuously from gap 30 toward a center of the platform 14 such that gap 30 and slot 40 define the cantilever arms 42, 43 as opposing ends of the skirt 26. Each cantilever arm 42, 43 is configured to be flexible so that it can move between a resting position as shown in FIGS. 1-7 and a clamped position in which cantilever arms 42, 43 are closer to each other and can even touch each other. Gap 30 passes completely through base 12 to allow the cantilever arms 42, 43 to move entirely independently of each other. In other embodiments, gap 30 may pass only partially through the base 12 or may not be provided at all.

Figure 3:
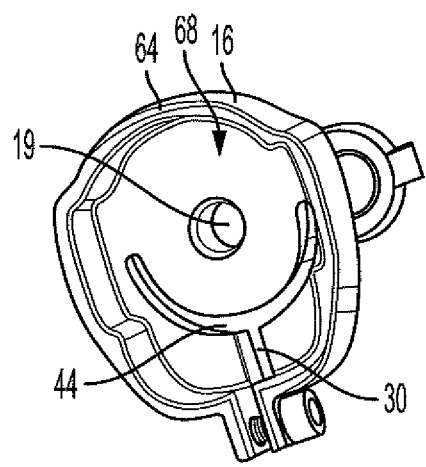
FIG. 3 is a perspective view from a distal end of the stylet feeder of FIG. 1.
Figure 4:
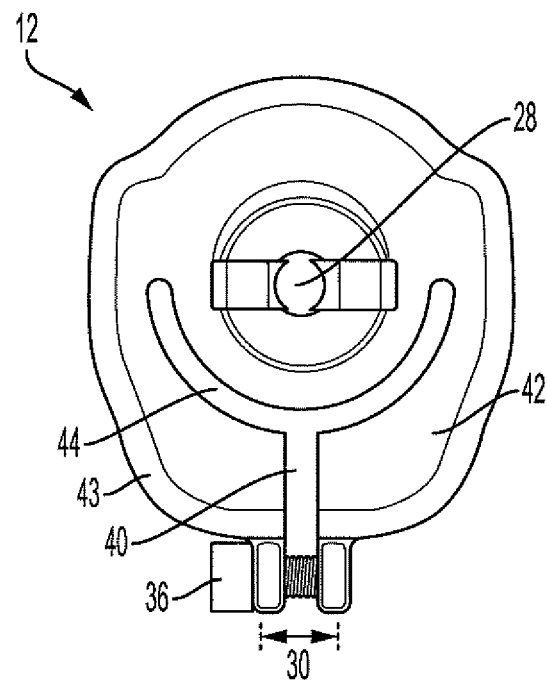
FIG. 4 is a top view of the stylet feeder of FIG. 1.
Figure 5:
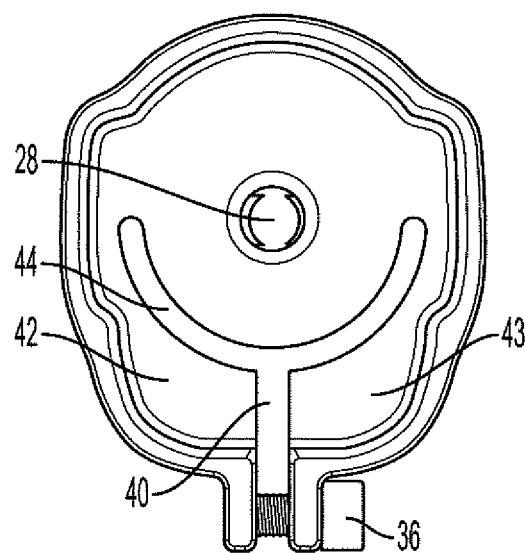
FIG. 5 is a bottom view of the stylet feeder of FIG. 1.

As depicted in FIGS. 3-5, gap 30 extends radially inwardly from one point on the perimeter of base 12 into slot 40, which further extends radially inward toward a center of platform 14. Slot 40 extends along a straight line from gap 30, and in other embodiments it may extend along a curved line or other non-linear path. After continuing radially inwardly, slot 40 connects with a relief 44 that is continuous with slot 40 and gap 30. As shown, relief 44 tracks the general perimeter of base 12 or it may form another shape which allows cantilever arms 42, 43 to move independently of each other. As shown in FIGS. 4 and 5, the relief 44 is arc-shaped and passes around a central portion of platform 14. However, other relief 44 shapes, such as various linear and non-linear designs, can also be utilized. Each of the gap 30, slot 40, and relief 44 may be continuous. Each end of the relief 44 may terminate at a midline of base 12 so that relief 44 is substantially semicircular. Alternatively, each end of relief 44 may terminate at a point past the midline of base 12 or closer to the slot 40 to allow for a greater or lesser degree of movement of cantilever arms 42, 43. Any of gap 30, slot 40, and relief 44 can have variable widths and can have enlarged terminal ends to reduce stress on the material of base 12 when cantilever arms 42, 43 flex.

Figure 6:
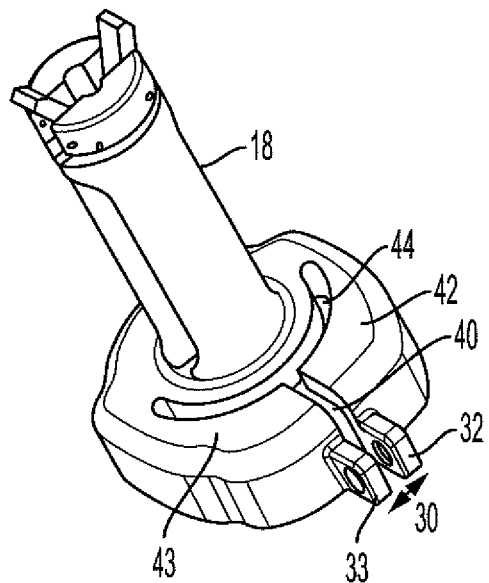
FIG. 6 is a perspective view of the stylet feeder of FIG. 1 with cantilever arms in a relaxed position.
Figure 7:
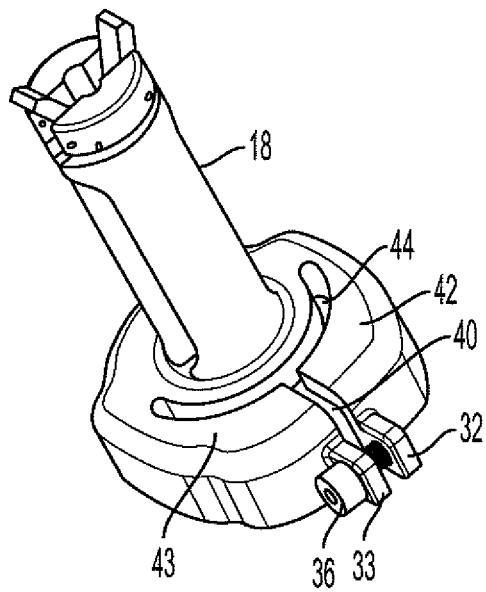
FIG. 7 is a perspective view of the stylet feeder of FIG. 1 with a fastener connected to the cantilever arms.

As shown in FIGS. 6-7, a pair of lateral protrusions 32, 33 extend radially outward from skirt 16 at the ends of cantilever arms 42, 43, respectively. Lateral protrusions 32, 33 are rectangularly shaped as depicted, and may be any other shape configured to attach to the cantilever arms 42, 43 of skirt 16. Both of the lateral protrusions 32, 33 include apertures 34 for accepting a fastener 36. As such, one of apertures 34 may be threaded such that when fastener 36 is driven through lateral protrusions 32, 33, the lateral protrusions 32, 33 are drawn closer together. That is, the aperture 34 on the lateral protrusion 32, 33 opposite to the head of the fastener can be threaded, so that rotation of the fastener 36 can pull lateral protrusions 32, 33 closer to one another between the threaded connection on one and the force of the head of the fastener 36 on the outside of the other. Fastener 36 may be a screw or another type of bolt, rivet, clasp, hook, etc. known in the art. Locking features such as lock washers and nuts may be utilized to ensure fastener 36 does not back out of apertures 34.

When fastener 36 is absent, cantilever arms 42, 43 are in a relaxed state and may move independently of each other due to relief 44. While in the relaxed state, base 12 may be manipulated to fit over the end of a tool 70, such as a drill or a robotic end effector, configured to drive a screw into bone. Once base 12 is seated on tool 70, fastener 36 may be driven through apertures 34 of lateral protrusions 32, 33 to force cantilever arms 42, 43 together into a clamped position that grips the tool 70. When cantilever arms 42, 43 are in the clamped position, gap 30 may be smaller than it would be in the relaxed position. Gap 30 may or may not be completely closed when base 12 is connected to a tool. Fastener 36 can also be present but unscrewed or opened enough to permit inward and outward flexing of cantilever arms 42, 43 so that fastener 36 does not have to be manually inserted through apertures 34 during use.

Figure 2:
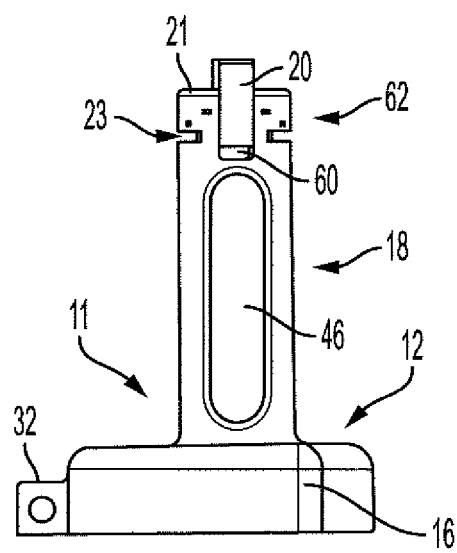
FIG. 2 is a side view of the stylet feeder of FIG. 1.

As depicted in FIGS. 1 and 2, extension 18 is generally cylindrical and extends proximally from the platform 14. Other cross-sectional shapes of extensions 18, such as cuboids or other rectangular prismatic shapes, are envisioned. A passage or cannulation 28 extends through extension 18 and base 12 in a proximal-distal direction to allow a threaded stylet 26 to pass therethrough. The extension 18 is at least partially hollow to form a window 46 extending laterally through extension 18 and in the proximal-distal direction. A hole 19 forming a portion of cannulation 28 and is located at the junction of the extension 18 and base 12.

Extension 18 includes a pawl assembly 62 having first and second pawls 20, 52 at its proximal end away from the base 12. At least one cutout 60 is located at the proximal end of extension 18 to accommodate pawls 20, 52 so they can each rotate with respect to an axis perpendicular to cannulation 28. Threaded stylet 26 has left-handed threads configured to engage with corresponding threads of at the distal ends of first and second pawls 20, 52. The pawl assembly 62 allows stylet 26 to translate axially into tool 70 but only translate out of tool 70 by rotation of stylet 26. Thus, stylet 26 may be passed into a screw. When an operator drives the screw into a bone, the left-hand threads of the stylet 26 and pawl assembly 62 will simultaneously engage and retract stylet 26 out of the screw. Operation of stylet 26 is further described in U.S. Pat. App. Pub. No. 2020/0281608, which is hereby incorporated by reference.

Figure 10:
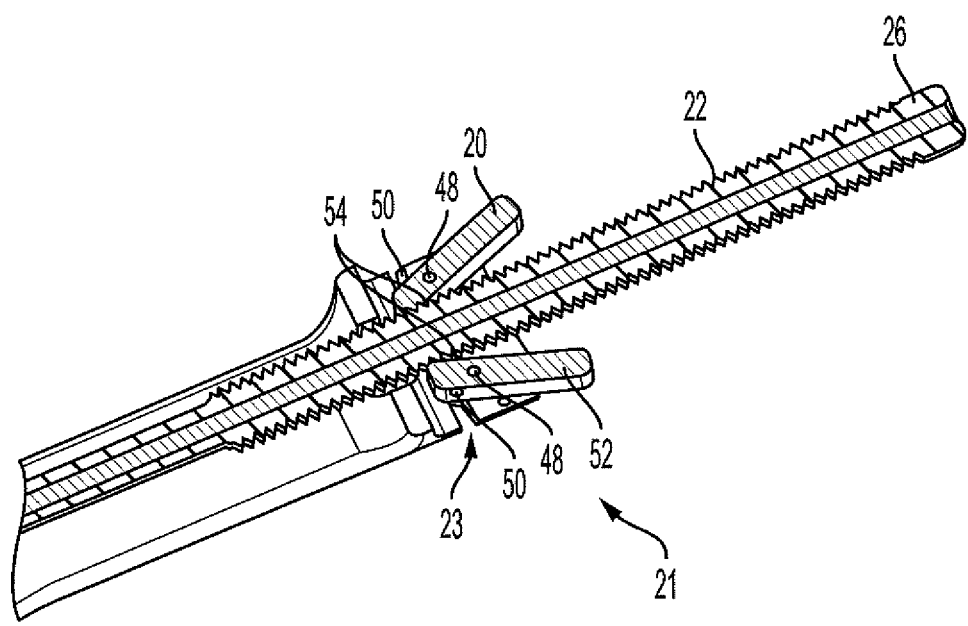
FIG. 10 is a cross-sectional view of the stylet feeder of FIG. 1 and the stylet.
Figure 11:
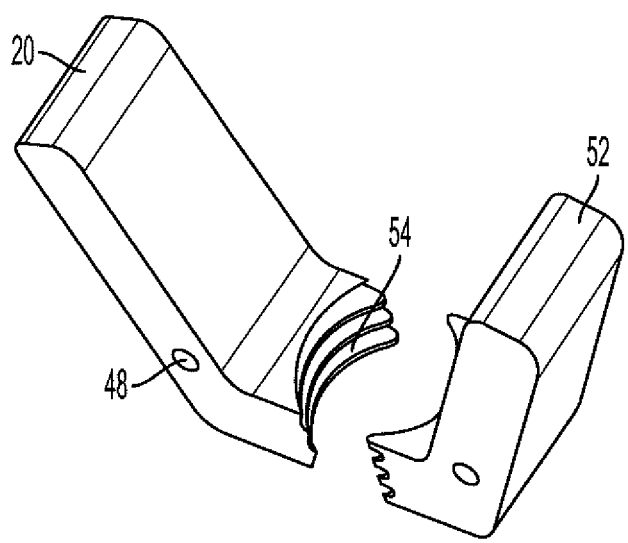
FIG. 11 is a perspective view of pawls of the stylet feeder of FIG. 1.

Extension 18 includes a proximal end 21 that houses pawls 20, 52 of the pawl assembly 62. As shown in FIG. 10, proximal end 21 includes vertical slots each providing surfaces to hold pawls 20, 52 and allow them to rotate about respective pivot points or axes 48. A hole can extend through pawls 20, 52 and into proximal end 21 of extension 18 for an axle to pin each pawl 20, 52 in place along axes 48. That is, pivot point 48 may be a hole extending entirely through the body of the pawl 20 and into extension 18 that a pin can pass therethrough, a hole extending partially through the body of pawl 20 that a pin can rest in, or another pivoting arrangement. In other embodiments, a screw can extend through pawls 20, 52 and into top portion 21, or a ball/detent configuration can be provided at each interface of each of pawls 20, 52 and proximal end 21 to permit the pawls 20, 52 to be snapped into place. An elastic band or spring 50 can be disposed within an annular recess 23 of proximal end 21 and in contact with the distal ends of pawls 20, 52 so that threads 54 on the distal ends of pawl 20, 52 are biased toward each other and into engagement with a threaded portion 22 of stylet 26. Spring 50 may be any type of coil spring, compression spring, or other spring known in the art.

At least one window 46 is formed or cut laterally into extension 18. The window 46 may be oblong and extend almost entirely along the length of extension 18, or it may be a different shape and extend along a smaller portion of extension 18. The window 46 preferably passes completely through the body of the extension 18, such that an operator can see through to stylet 26 when it is present.

Stylet feeder 10 may be a monolithic body 11 including base 12, extension 18, cantilever arms 42, and lateral protrusions 32, 33. Spring 50, and pawls 20, 52 and any components needed for connecting them to extension 18, can be provided separately and assembled with body. Body 11 may be formed of any surgical grade rigid material such as plastic or polymeric material, ceramic, or metal, and particularly various metals such as titanium, titanium alloys, stainless steel, cobalt chrome alloys, tantalum and niobium, or any combination thereof. Each component of the present invention may be formed by an additive manufacturing process, including but not limited to electron beam melting (EBM), selective laser sintering (SLS), selective laser melting (SLM), binder jet printing, and blown powder fusion for use with metal powders. Other common manufacturing methods, such as injection molding or 3D printing, can be utilized that allow for the formation of a monolithic part. Different materials may be used for different components. For example, pawls 20, 52 may be metal to engage with a metal threaded portion 22 of stylet 26, and the rest of stylet feeder 10 may be plastic. It is envisioned that stylet feeder 10 may be formed of any material known in the art that is adapted to engage with a screw insertion tool.

A method of using a stylet feeder 10 includes first attaching stylet feeder 10 to a tool 70. An operator may manipulate cantilever arms 42, 43 of stylet feeder 10 while they are in a relaxed state so that lip 64 encapsulates or surrounds the proximal end of tool 70. Once the stylet feeder 10 is seated onto tool 70, the operator may tighten fastener 36 within apertures 34 of lateral protrusions 32. This, in turn, draws cantilever arms 42, 43 closer together and closes the gap between the cantilever arms 42, 43.

Once the stylet feeder 10 is secured to tool 70, a stylet 26 may be passed through cannulation 28 of stylet feeder 10. Stylet 26 is first passed through pawl assembly 62. Because pawls 20, 52 are spring-loaded, threaded portions 54 of pawls 20, 52 can be pinched to pivot them away from each other to allow stylet 26 to pass therethrough. Stylet 26 then translates along the axis of the cannulation 28 and passes through hole 19 between extension 18 and base 12. The stylet 26 then passes into a tool 70, where it may engage with a hex feature which keys stylet 26 to rotate along with a driver. Such hex feature may be a hex feature like that seen in U.S. Pat. App. Pub. No. 2020/0281608, which is hereby incorporated by reference as indicated above.

In use, an operator may provide the above stylet feeder 10 in a system with a handheld surgical tool such as a drill, a screwdriver configured to be driven by the tool and equipped with a hex feature, for example, and a stylet 26. The operator may then impact stylet 26 into bone to dock the screw to the intended screw insertion location. The stylet 26 may also be implanted into the bone by ultrasonic bone penetration or other bone penetration methods known in the art. The screw may then be driven into the bone at the location of stylet 26 in a manner as described in U.S. Pat. App. Pub. No. 2020/0281608. Because of the hex feature within tool 70, and because stylet 26 can only be retracted out of stylet feeder 10 by rotating stylet feeder 26 opposite the direction of the bone screw insertion direction due to the left-hand threads, stylet 26 will automatically retract out of the screw as the screw is driven into the bone. Spring 50 of pawl assembly 62 ensures that stylet 26 will not translate distally back into the screw as stylet 26 is retracted proximally out of the screw. Upon implantation of the bone screw into bone, stylet 26 may be fully retracted out of the bone screw. The system may include one or more additional handheld surgical tools, such as various drills, so that stylet feeder 10 is configured to be used with several different tools and to lock to each tool despite varying geometries or sizes of the proximal ends of such tools. In this way, manufacturing is simplified by providing one stylet feeder 10 that accommodates several tools, which avoids the need to create dedicated feeders for each tool.

As depicted in FIG. 12, a system is provided. The system includes a surgical tool, such as a handheld surgical drill, and a stylet feeder 10. Stylet feeder 10 is attached to the proximal end of the surgical tool 70. A screwdriver is configured to be driven by the distal end of the drill. A stylet 26 is configured to pass through a lumen that extends through stylet feeder 10, surgical drill, and screwdriver. The system is configured so that when stylet 26 is positioned within a head of a screw and the screw is driven into a bone, stylet feeder 10 retracts stylet 26 from the screw.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A stylet feeder for connection to a surgical tool, the stylet feeder comprising:
   a base for attaching to a surgical tool, the base having a platform and a skirt extending distally from the platform and defining a slit passing between opposing ends of the skirt when the stylet feeder is in a resting configuration; and
   an extension protruding proximally from the platform of the base, the extension having a proximal end housing a pawl, the pawl having a distal end with a threaded portion,
   wherein the base and the extension define a passage extending in a proximal-distal direction such that the stylet feeder is cannulated for accepting a stylet therethrough.

2. The stylet feeder of claim 1, wherein each of the opposing ends of the skirt include a lateral protrusion extending outward from the skirt.

3. The stylet feeder of claim 2, wherein each of the lateral protrusions define an aperture therethrough for connection with a fastener.

4. The stylet feeder of claim 3, further comprising a fastener disposed through the apertures of the lateral protrusions and configured to force the lateral protrusions toward each other and into a clamped configuration.

5. The stylet feeder of claim 4, wherein at least one of the apertures is internally threaded.

6. The stylet feeder of claim 4, wherein the fastener is a screw.

7. The stylet feeder of claim 1, wherein the skirt and the platform define a cavity into which a proximal end of a surgical tool can be disposed and secured.

8. The stylet feeder of claim 1, wherein the slit passes through a portion of the platform.

9. The stylet feeder of claim 8, wherein the slit defines opposing cantilever arms of the base formed by portions of the platform and the skirt.

10. The stylet feeder of claim 9, wherein the skirt and the platform define a cavity, and a volume of the cavity is variable and based on positions of the cantilever arms with respect to each other.

11. The stylet feeder of claim 8, wherein the platform further defines a relief passing entirely through the platform from and continuous with an end of the slit.

12. The stylet feeder of claim 11, wherein the relief extends in an arc shape around a central portion of the platform.

13. The stylet feeder of claim 1, wherein the extension defines a window passing laterally therethrough.

14. The stylet feeder of claim 1, wherein the pawl is pivotable such that the distal end can move toward and away from the passage through the extension.

15. The stylet feeder of claim 14, wherein the pawl is attached to the extension at a pivot point and separately attached to the extension by a spring.

16. The stylet feeder of claim 1, wherein the threaded portion of the pawl is a left-handed thread.

17. The stylet feeder of claim 1, wherein the extension further includes a second pawl having a distal end with a threaded portion, wherein the threaded portions of the pawls oppose each other.

18. The stylet feeder of claim 17, wherein the pawls are each pivotable such that the distal ends of the pawls can move toward and away from each other for engaging with a k-wire when the k-wire is disposed within the passage.

19. A system comprising:
   a handheld surgical tool;
   the stylet feeder of claim 1 configured to be attached to a proximal end of the surgical tool;
   a screwdriver configured to be driven by a distal end of the surgical tool; and
   a stylet configured to pass through a lumen extending through the surgical tool, the stylet feeder, and the screwdriver when the surgical tool, the stylet feeder, and the screwdriver are assembled.

* * * * *